US009418347B2

(12) United States Patent
George et al.

(10) Patent No.: US 9,418,347 B2
(45) Date of Patent: Aug. 16, 2016

(54) INTEGRATED DISPLAY OF DATA METRICS FROM DIFFERENT DATA SOURCES

(71) Applicant: Adobe Systems Incorporated, San Jose, CA (US)

(72) Inventors: William Brandon George, Pleasant Grove, UT (US); Kevin G. Smith, Lehi, UT (US)

(73) Assignee: Adobe Systems Incorporated, San Jose, CA (US)

( * ) Notice: Subject to any disclaimer, the term of this patent is extended or adjusted under 35 U.S.C. 154(b) by 206 days.

(21) Appl. No.: 13/956,689

(22) Filed: Aug. 1, 2013

(65) Prior Publication Data

US 2015/0040048 A1    Feb. 5, 2015

(51) Int. Cl.
*G06T 11/20* (2006.01)
*G06Q 10/06* (2012.01)
*G06Q 30/02* (2012.01)

(52) U.S. Cl.
CPC ............... *G06Q 10/06* (2013.01); *G06Q 30/02* (2013.01)

(58) Field of Classification Search
CPC ..... G06T 11/206; G06T 15/005; G06T 11/60; G06T 1/60; G06F 17/30592; G06F 9/466; G06F 3/0481; G06F 9/4446; G06F 9/543; G06F 8/34; G06F 9/4443; G06F 17/30011; G06F 17/24; G06F 17/246; G06Q 10/10; G11B 27/034
USPC .............. 345/418, 440, 440.2, 442, 443, 501, 345/530, 619, 634, 643, 645; 707/600, 601, 707/602, 603, 604, 607, 608; 715/200, 201, 715/202, 203, 204, 212, 215, 700, 708, 711, 715/712, 713, 717, 724, 731, 732, 733, 738, 715/747, 762, 763, 764, 765, 766, 771, 772, 715/773, 804
See application file for complete search history.

(56) References Cited

U.S. PATENT DOCUMENTS

| | | | |
|---|---|---|---|
| 6,529,217 B1* | 3/2003 | Maguire et al. ................ 715/769 |
| 2003/0071814 A1* | 4/2003 | Jou ......................... G06F 9/542 345/440 |
| 2003/0101028 A1* | 5/2003 | Banks ..................... G06F 17/18 702/189 |
| 2005/0021748 A1* | 1/2005 | Garcea et al. .................. 709/224 |
| 2008/0163099 A1* | 7/2008 | Gu et al. ........................ 715/780 |
| 2010/0082705 A1* | 4/2010 | Ramesh ............ G06F 17/30471 707/808 |
| 2010/0121675 A1* | 5/2010 | Charles .......................... 705/10 |
| 2011/0283231 A1* | 11/2011 | Richstein .............. G06F 3/0488 715/810 |
| 2011/0307298 A1* | 12/2011 | Russ ........................... 705/7.33 |
| 2012/0017165 A1* | 1/2012 | Gardner ............ G06F 17/30899 715/771 |

* cited by examiner

*Primary Examiner* — Xiao Wu
*Assistant Examiner* — Sarah Lhymn
(74) *Attorney, Agent, or Firm* — Kilpatrick Townsend & Stockton LLP

(57) ABSTRACT

Systems and methods for are disclosed for providing integrated display of data metrics from different data sources. In some embodiments, an icon representing a de-limited data file can be positioned on a graphical interface that displays first metrics data for a first time period. An integration module can respond to the positioning of the icon by determining that the de-limited data file includes second metrics data for a second time period at least partially overlapping with the first time period. The integration module can update the graphical interface to display at least some of the second metrics data from the delimited data file with the first metrics data. The first metrics data and the second metrics data can be displayed for at least an overlapping portion between the first and second time periods.

22 Claims, 9 Drawing Sheets

INTEGRATED DISPLAY OF DATA METRICS FROM DIFFERENT DATA SOURCES

TECHNICAL FIELD

This disclosure relates generally to computer-implemented methods and systems and more particularly relates to integrated display of data metrics from different data sources.

BACKGROUND

Various computing applications allow companies or other entities to analyze marketing campaigns, revenue trends, and/or other business functions. Companies or other entities use business data from multiple sources, such as analytics vendors, advertising agencies, search vendors, display vendors, email vendors, stores, inventory, financial logs, etc. In these contexts, it may be desirable to compare different sources of data.

Prior solutions for combining, organizing, and/or comparing data from different sources may involve downloading data from multiple sources into one or more combined spreadsheets. The data from the different sources may be combined into a database. Complex query processes may be used to extract specific subsets of information from the database. Other solutions may involve uploading data from such spreadsheets into a common system. These prior solutions may involve significant configuration and formatting requirements to map data obtained from different sources to a format used by the common system in order to view integrated data in the common system. Prior solutions for combining offline and online data may therefore involve complicated uploading methods and increased processing time.

It is desirable to provide simplified solutions for integrating business metrics and other data from multiple data sources.

SUMMARY

One embodiment involves positioning an icon representing a de-limited data file on a graphical interface. The graphical interface displays first metrics data for a first time period. The first metrics data and the de-limited data file are obtained from different data sources. The embodiment further involves responding to the positioning of the icon by determining that the de-limited data file includes second metrics data for a second time period at least partially overlapping with the first time period. The embodiment further involves updating the graphical interface to display at least some of the second metrics data from the delimited data file with the first metrics data for at least an overlapping portion between the first and second time periods.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings, where.

DETAILED DESCRIPTION

Figure 1:
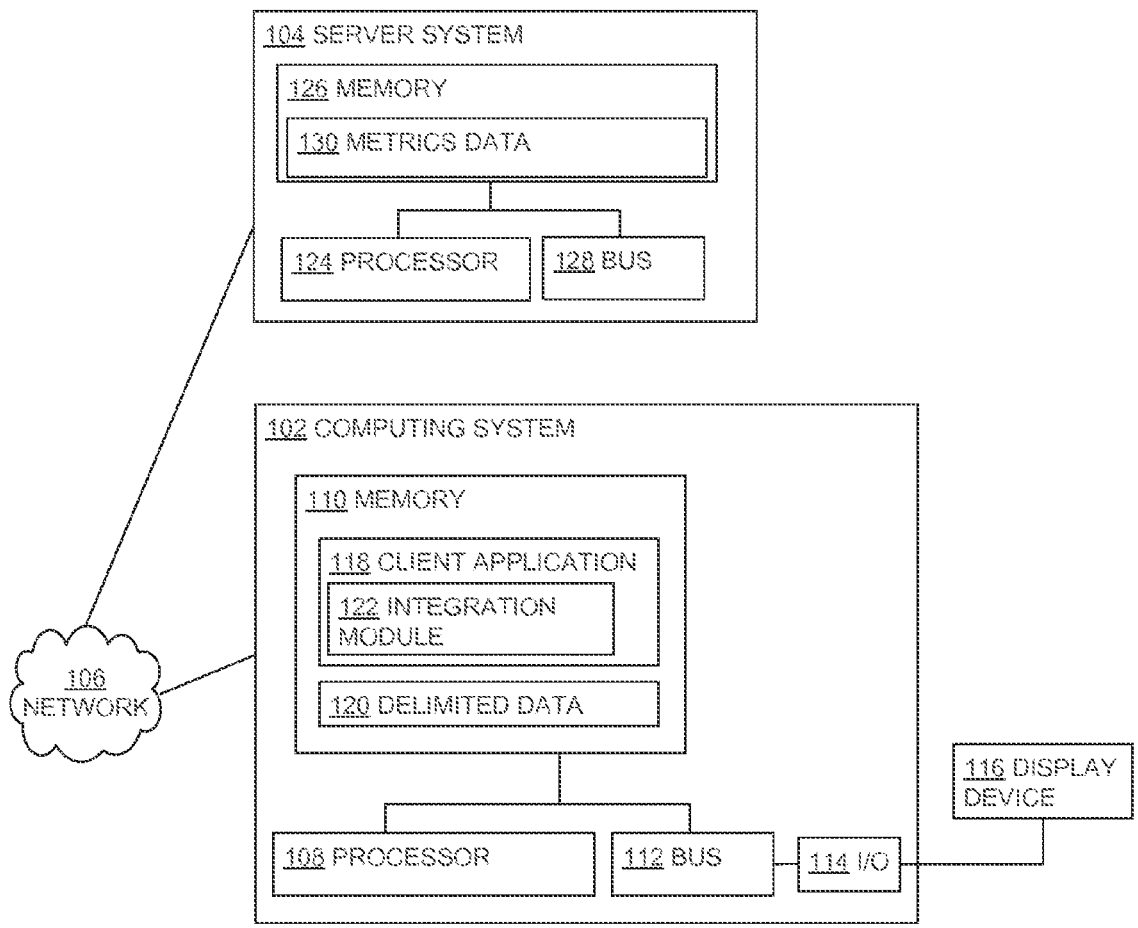
FIG. 1 is a block diagram depicting example computing systems for implementing certain embodiments.

Computer-implemented systems and methods are disclosed for integrated display of data metrics from different data sources, such as "online" data from a server displayed via a website and "offline" data from a spreadsheet file stored locally at a computing device accessing the website. Automatically integrating the display of data metrics from different data sources can provide real-time data integration. Automatically integrating the display of data metrics from different data sources can also decrease or eliminate tasks associated with configuring an online data source to import offline data.

The following non-limiting example is provided to help introduce the general subject matter of certain embodiments. A delimited data file, such as (but not limited to) a spreadsheet or a data file including comma-separated or tab-separated values, may be stored at a computing device. The delimited data file can store data in pivot-table format that includes a header row with multiple column headers and data rows with respective values for the column headers. The computing device can access a website or other online data source to display metrics data that is similar to the data from the delimited data file. For example, the delimited data file may include data describing store-based sales of a product and the website may be used to access and display business metrics describing web-based sales of the product. An icon representing the delimited data file may be dragged and dropped onto a chart presented by the website for displaying the web-based sales metrics. The web browser can include an integration module or other client-side code for integrating data from the delimited data file and the online metrics data for display via the chart presented by the website. The data from the delimited data file can thus be displayed for comparison with the data from the online data source.

An icon representing a delimited data file can thus be positioned on a graphical interface via a drag-and-drop operation. The associated delimited data can be automatically integrated with metrics data presented via the graphical interface without using a plug-in or other software module that is specifically designed for importing the delimited data into the application used to generate the metrics data. Automatically integrating the display of data metrics from different data sources using a drag-and-drop or other placement operation can reduce or eliminate the need to upload offline data separately from a browser application using a file-transfer protocol application or other file transfer application.

In accordance with some embodiments, an integration module executed by a processor can integrate data from different data sources, such as online data and offline data. An icon representing a delimited data file can be positioned on a graphical interface that displays metrics data for a time period. For example, an icon representing a spreadsheet file can be dragged and dropped onto a graphical interface presented in a web browser. The metrics displayed in the graphical interface and the delimited data file can be obtained from different data sources. For example, the delimited data file may be obtained from the local memory of a computing device (e.g., a computer accessing a website) and the metrics may be retrieved or otherwise obtained from a data source over the Internet (e.g., a server system accessible via the website). An integration module included in a web browser or other application can determine that the delimited data file includes data identifying multiple time intervals that at least partially overlap with the time period displayed in the graphical interface. For example, the graphical interface may display business metrics from several months of a year and the delimited data file may include data associated with various time periods including the same months of the same year. The integration module can update the graphical interface to display both data for the metrics and data from the delimited data file that describes at least one additional metric. The data describing the metrics and the additional metric can be displayed for the overlapping time period. For example, the graphical interface may be updated to display both online data describing web-based sales metrics for a given year along with data obtained from the delimited data file that describes store-based sales for the same year.

As used herein, the term "delimited data file" is used to refer to a data file in which data is organized into multi-dimensional arrays of data having one or more data values designated as a delimiter for specifying boundaries between different entries in an array. Non-limiting examples of a delimited data file include a spreadsheet, a data file having comma-separated values, a data file having tab-separated values, a data file having colon-separated values, etc. Non-limiting examples of data arrays can include rows corresponding to records and/or columns corresponding to fields in records. In some embodiments, one or more arrays of a delimited data file can include headers, such as (but not limited to) column headers identifying a category or other attribute common to multiple data values in a column from multiple records.

As used herein, the term "metrics" is used to refer to data describing measures of performance for an organization or other entity. For example, business metrics can include data describing a number of sales, an amount of revenue, a number of orders, etc.

As used herein, the term "integration module" is used to refer to executable code configured for performing one or more operations for providing integrated display of data metrics from different data sources. An integration module can include a plug-in or other code included in or accessible by a browser application or other suitable application. In some embodiments, the integration module can integrate data from different data sources without performing one or more steps involved in manually mapping data fields for the first data source to data fields for the second data source.

As used herein, the term "online data" is used to refer to data retrievable from a data source (such as, but not limited to, a web server) that is accessible via a data network (such as, but not limited to, the Internet). For example, a website accessed by a computing system can display online data retrieved from a web server system during a session established with the website by the first computing system.

As used herein, the term "offline data" is used to refer to data that is stored to a data source that is inaccessible via a data network or that is otherwise restricted from being accessed via the data network. In some embodiments, data may be offline (i.e., inaccessible via the network) even though a system at which the data is stored is accessible via a network. For example, offline data may be stored in a memory location or secure directory that is configured to be inaccessible to one or more entities via the data network by restricting the sharing of the memory location or directory and/or restricting access rights with respect to the memory location or secure directory.

In some embodiments, the integration module can allow sharing of offline data via an online forum. For example, a spreadsheet or other delimited data file can be dragged and dropped into a feed or other graphical interface displayed by a website. The spreadsheet or other delimited data file can be positioned adjacent to related data in the feed or other graphical interface. The integration module can respond to the drag-and-drop operation by rendering a graph, table, or other suitable object for displaying data from the spreadsheet or other delimited data file in a portion of the graphical interface indicated by the drag-and-drop operation. In some embodiments, the spreadsheet or other delimited data file can be stored in an online data source for downloading via the website by other users having access to the feed or other graphical interface in the website.

In additional or alternative embodiments, the integration module can allow comparison of offline data with online data via an online forum. For example, a spreadsheet or other delimited data file can be dragged and dropped into a chart, graph, or other display object in a graphical interface provided by a website for presenting online data. The online data can be organized by date or time. The integration module can automatically map date or time values in the spreadsheet with date or time values of the online data. The integration module can update the graphical interface to display data from the spreadsheet in the same chart, graph, or other display object. The integrated display of the online data and the data from the spreadsheet can allow for real-time comparison, correlation, or other analysis of the online data and offline data in a common graphical interface.

In additional or alternative embodiments, the integration module can allow storage of the offline data to an online data source. For example, a spreadsheet or other delimited data file can be dragged and dropped into a graphical interface provided by a website for accessing an online data source. The integration module can automatically map and upload the offline data for storage with other online data in the online data source. The results of the automated uploading process can be displayed in the graphical interface. The integration module can reduce or eliminate the use of a complicated wizard used for data mapping purposes in uploading offline data to an online data source.

In some embodiments, a simple graphical interface can be used to refine mapping of the offline data to the online data source. For example, the integration module can provide a graphical interface listing suggested mapping and/or a list of fields in the offline data that cannot be automatically mapped to the online data source. The graphical interface can be used to resolve data mappings and/or provide improved accuracy with respect to such mappings. For example, the graphical interface can identify columns in the offline data file to be aggregated for uploading to the online data source, identify a default subset of the offline data to be uploaded and/or displayed, etc. In some embodiments, the integration module can store data describing manual configurations via the mapping graphical interface. The integration module can use the data describing historical manual configurations to improve the accuracy of suggested mappings and/or improve the accuracy of automated mappings for subsequent integrations of offline data with online data.

In additional or alternative embodiments, data from a delimited data file or other offline data can be integrated with metrics data or other data from an online or other data source using a data attribute other than time. For example, different data sets from different data sources may include data items with data attributes such as (but not limited to) a geographic location, a specific product name, a specific business metric (e.g., page views for a business web page), etc. The integration module can determine that online data presented in a graphical interface is organized according to the data attribute. The integration module can determine that data from an offline data source or other data source includes data having the same data attribute used to organize the online data in the graphical interface. The integration module can update the graphical interface to display offline data obtained from a delimited data file that is organized using the same data attribute.

As used herein, the term "data item" is used to refer to individual units of a data set having one or more data values. Non-limiting examples of a data item include a row in a spreadsheet or delimited file, a record in a database, etc.

In some embodiments, the delimited data may include data values for a data attribute that do not overlap with data values for the data attribute in the metrics data. In one non-limiting example, the delimited data and the metrics data may include data that can be organized based on date and/or time without the delimited data and the metrics data having any overlapping time values. In another non-limiting example, the delimited data and the metrics data may include data that can be organized based on geographical location without the delimited data and the metrics data having any data associated with a common geographical location. Updating the graphical interface to include both the delimited data and the metrics data may include, for example, modifying an axis along which data is organized to include values from both the delimited data and the metrics data. For example, a horizontal axis may be expanded to include data, time, geographic, or other values of the data attribute from the delimited data positioned adjacent to values of the data attribute from the metrics data.

Referring now to the drawings, FIG. 1 is a block diagram depicting example computing systems for implementing certain embodiments. The example computing systems include a computing system 102 and a server system 104 in communication via a data network 106.

The computing system 102 includes a processor 108. The processor 108 may include a microprocessor, an application-specific integrated circuit ("ASIC"), a state machine, or other suitable processing device. The processor 108 can include any number of computer processing devices, including one. The processor 108 can be communicatively coupled to a computer-readable medium, such as a memory 110. The processor 108 can execute computer-executable program instructions and/or accesses information stored in the memory 110. The memory 110 can store instructions that, when executed by the processor 108, cause the processor to perform operations described herein.

A computer-readable medium may include (but is not limited to) an electronic, optical, magnetic, or other storage device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

The computing system 102 can also include a bus 112, an input/output ("I/O") interface 114, and a display device 116. The bus 112 can communicatively couple one or more components of the computing system 102. The I/O interface 114 can receive input from input devices (e.g., a keyboard, a mouse, a touch screen, etc.) and provide output to output devices such as (but not limited to) a display device 116. A display device 116 can display output (e.g., graphical interfaces, data, etc.) generated by the processor 108 based on executing computer-readable instructions stored in the memory 110. Non-limiting examples of a display device include a monitor, a touchscreen, etc.

The computing system 102 can include any suitable computing device or system for communicating via a data network 106 and executing computer-readable instructions stored in the memory 110. Non-limiting examples of a suitable computing device or system include a desktop computer, a laptop computer, a tablet computer, etc.

The server system 104 includes a processor 124. The processor 124 may include a microprocessor, an application-specific integrated circuit ("ASIC"), a state machine, or other suitable processing device. The processor 124 can include any number of computer processing devices, including one. The processor 124 can be communicatively coupled to a computer-readable medium, such as a memory 126. The processor 124 can execute computer-executable program instructions and/or accesses information stored in the memory 126. The memory 126 can store instructions that, when executed by the processor 124, cause the processor to perform operations described herein. A bus 128 can also be included in the server system 104. The bus 128 can communicatively couple one or more components of the server system 104.

The server system 104 can include any suitable computing system for hosting or accessing the metrics data 130. In some embodiments, the server system 104 may be a single computing system. In other embodiments, the server system 104 may be a virtual server implemented using a number of computing systems connected in a grid or cloud computing topology.

FIG. 1 also depicts a client application 118 and delimited data 120 stored in the memory 110 and metrics data stored in the memory 126. The client application 118 can include one or more software modules for establishing communication with the server system 104 and obtain the metrics data 130 for display. The client application 118 can also include one or more software modules for performing functions in addition to establishing communication with the server system 104. A non-limiting example of a client application 118 is a web browser application.

The integration module 122 of the client application 118 can be configured for integrating the display of the metrics data 130 with at least some of the delimited data 120, as described in detail below. The integration module 122 can be a plug-in or other module implemented using any suitable programming language. A suitable programming language can be a programming language that can provide a virtual machine embedded in a browser application or other client application 118. A virtual machine can include a software abstraction of a separate operating system executed on a processing device. Non-limiting examples of a suitable programming language include scripting languages such as (but not limited to) JavaScript, GOOGLE® Dart, SUN® Java, JavaFX, MICROSOFT® ActiveX, etc. The integration module 122 can read data from the delimited data 120. The integration module 122 can access one or more files including the delimited data 120 via drag-and-drop operations or other suitable operations for accessing one or more files including the delimited data 120. In some embodiments, the integration module 122 can access a document object model ("DOM") used by a browser application or other suitable client application 118 such that the integration module 122 can manipulate a web page or other electronic content used by the client application 118 in real-time. Manipulating electronic content in real time can include executing both operations for initiating a modification to electronic content and corresponding operations for implementing manipulation within a defined period of time, such as during a session in which a web page or other electronic content is accessed.

Figure 2:
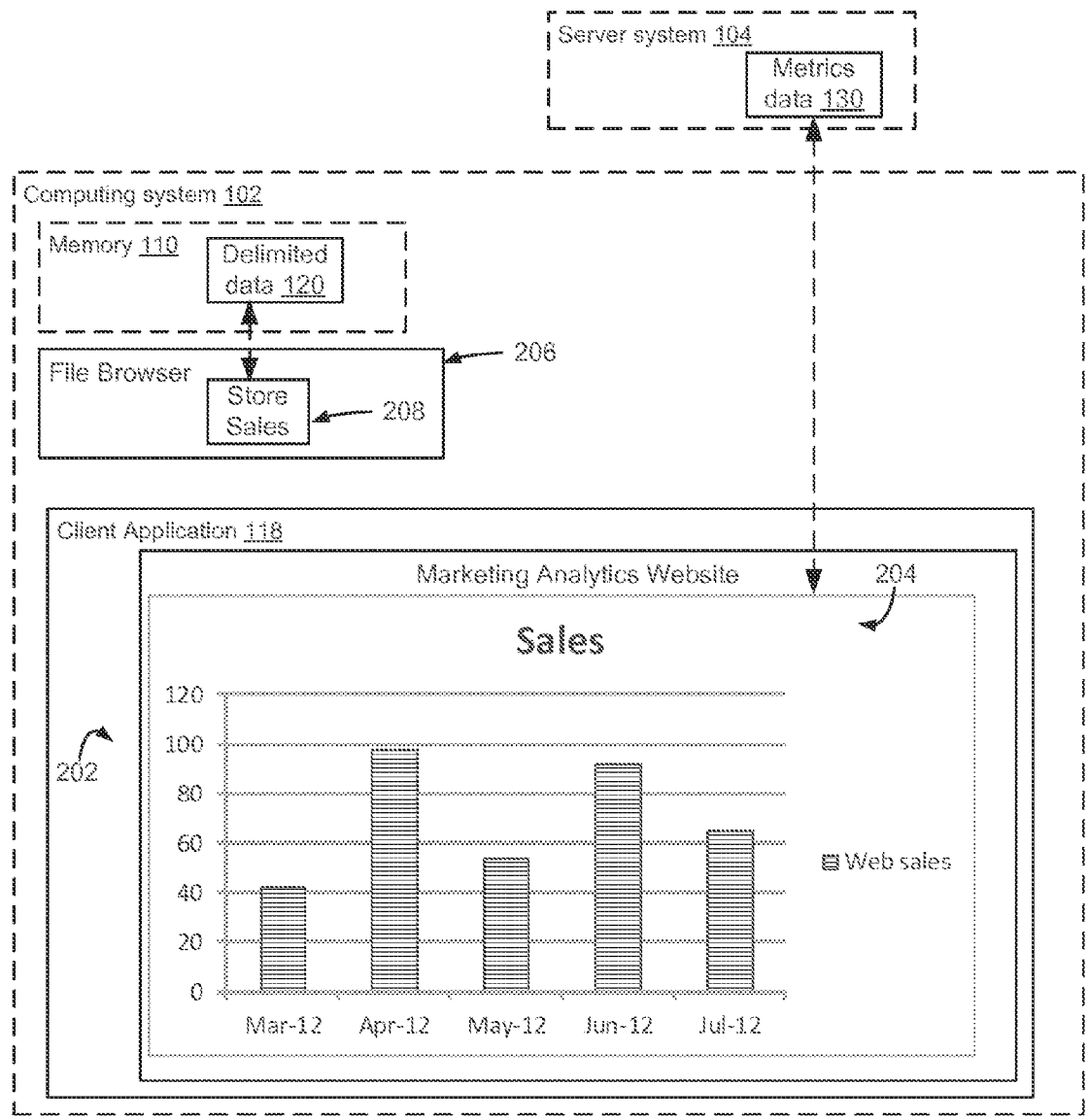
FIG. 2 is a modeling diagram depicting example graphical interfaces for integrating data metrics from different data sources for display.

FIG. 2 is a modeling diagram depicting example graphical interfaces 202, 206 for integrating data metrics from different data sources for display. The processor 108 can render the graphical interfaces 202, 206 for display via the display device 116.

The graphical interface 202 can be provided by the client application 118. The graphical interface 202 can be used to display metrics data 130 accessed by the client application 118 from the server system 104. For example, sales data 204 can represent, be derived from, or otherwise use the metrics data 130, as depicted by the bidirectional arrow in FIG. 2. In some embodiments, modifications to the sales data 204 as displayed in the graphical interface 202 can modify the metrics data 130 accordingly. In other embodiments, modifications to display of the sales data 204 in the graphical interface 202 can be performed without causing modifications to the underlying metrics data 130.

The sales data 204 can be displayed in any suitable format. For example, the sales data 204 is displayed in a graphical interface 202 of a website titled "Marketing Analytics Website," as depicted in FIG. 2. The sales data 204 is displayed using multiple bar graphs for respective months in a year, such as the months of March through July of the year 2012. The sales data 204 can include data describing sales of a given product via a website for the depicted months. In additional or alternative embodiments, types of metrics data 130 other than sales data can be displayed in a graphical interface 202. In additional or alternative embodiments, data can be displayed in a graphical interface 202 in formats other than bar graphs, such as charts, line graphs, data plots, tables, etc.

The graphical interface 206 can display one or more icons representing one or more files stored in the memory 110 and/or otherwise accessible by the computing system 102 via a data source other than the server system 104. For example, icon 208 labeled "store sales" can represent the delimited data 120, as depicted by the bidirectional arrow in FIG. 2. The delimited data 120 can include, for example, data describing sales of a given product via in-store transactions. Although FIG. 2 depicts sales data presented in the graphical interface 202, any type of metrics data 130 or other data can be presented in a graphical interface 202. Any type of metrics data 130 or other data can be integrated with data from a different data source, such as the delimited data 120.

The client application 118 can be configured to allow use of drag-and-drop or other positioning operations to combine offline data stored in the memory 110 with the sales data 204 displayed in the graphical interface 202. For example, the client application 118 may be a browser application accessing a website that is developed using HTML5. A function provided by HTML5 can include dragging an icon representing a file on a graphical interface in an HTML5-enabled website, dropping the icon that is positioned over the interface, and using data from the file in the website. A user can position the icon 208 representing the delimited data 120 onto the graphical interface 202. The integration module 122 can read data from the delimited data 120 for integration with the metrics data 130.

Figure 3:
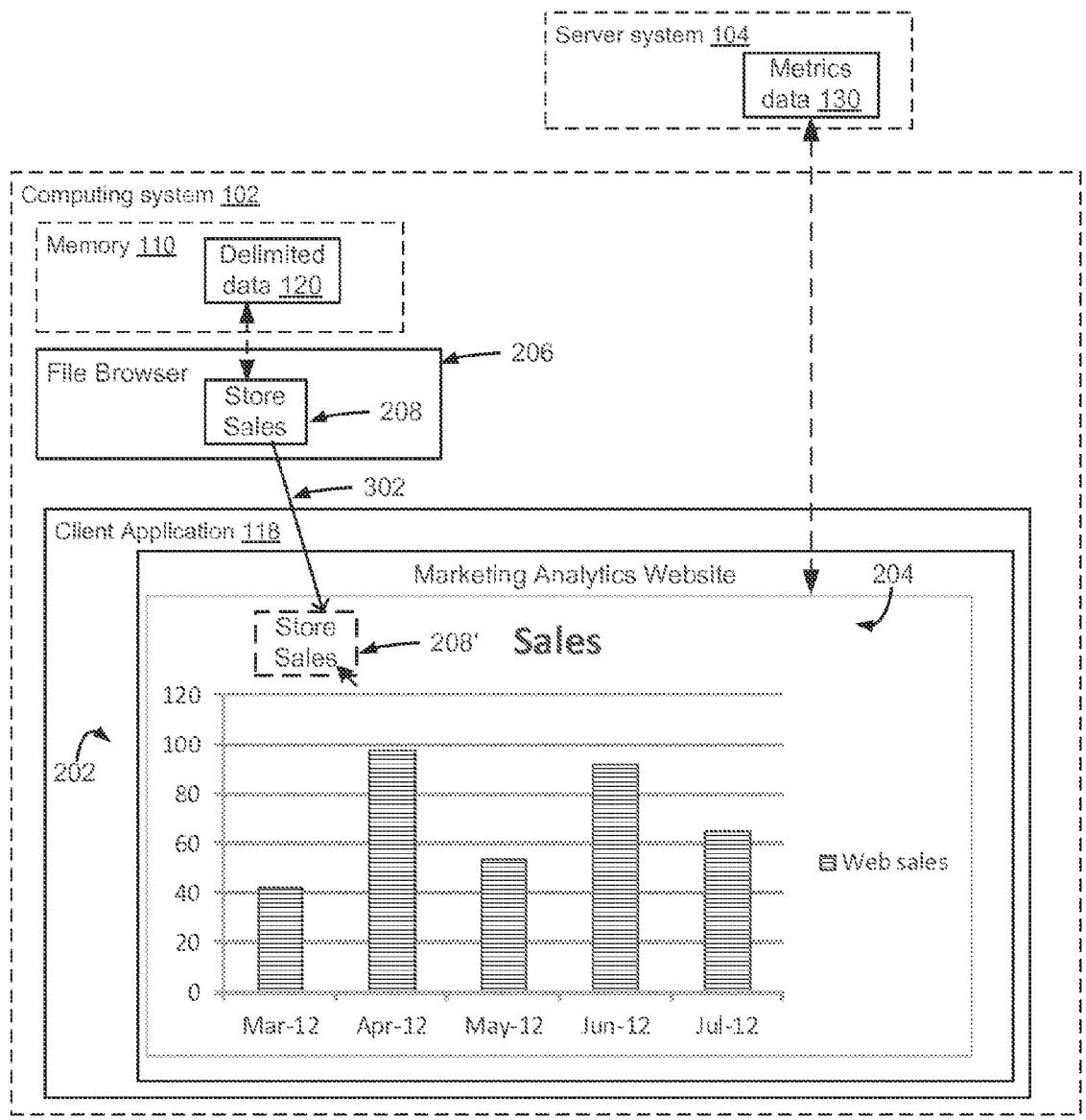
FIG. 3 is a modeling diagram depicting placement of an icon representing delimited data in a graphical interface that displays metrics data.

FIG. 3 is a modeling diagram depicting placement of an icon 208' representing delimited data 120 in a graphical interface 202 that displays metrics data.

The icon 208' can be a copy of the icon 208. The icon 208' can be positioned over the graphical interface 202 via a positioning operation 302. A non-limiting example of a positioning operation 302 is a drag-and-drop operation. A cursor can be positioned over the icon 208. A first input (e.g., clicking and holding a mouse button) can be received that indicates the icon 208 is to be selected. Selecting the icon 208 can generate the duplicate icon 208'. The cursor and the icon 208' can be moved to a position at least partially overlapping the graphical interface 202. A second input (e.g., releasing a mouse button) can be received that indicates that the delimited data 120 represented by icon 208' is to be included in the graphical interface 202. In some embodiments, the icon 208' can be positioned on a graphical interface 202 and the associated delimited data 120 can be integrated with the metrics data 130 without using a plug-in or other software module that is specific to the application used to generate the metrics data 130.

Positioning the icon 208' over the graphical interface 202 can cause the integration module 122 to process the delimited data 120 for integration with the metrics data 130 as displayed in the graphical interface 202. Processing the delimited data 120 for integration can include determining the type of data in the delimited data 120. For example, the client application 118 can determine that the delimited data 120 includes data formatted as strings, data formatted as integers, data formatted as floating point numbers, data formatted as dates, etc. Processing the delimited data 120 for integration can also include mapping at least some of the delimited data 120 to at least some of the metrics data 130 that is presented in the graphical interface 202 as the sales data 204. Mapping the delimited data 120 to the metrics data 130 can include identifying a common attribute between the delimited data 120 and the metrics data 130. For example, the integration module 122 can determine that both the delimited data 120 and the metrics data 130 include a date attribute by determining that each of the delimited data 120 and the metrics data 130 include rows or other records having at least one field with data formatted as dates.

Figure 4:
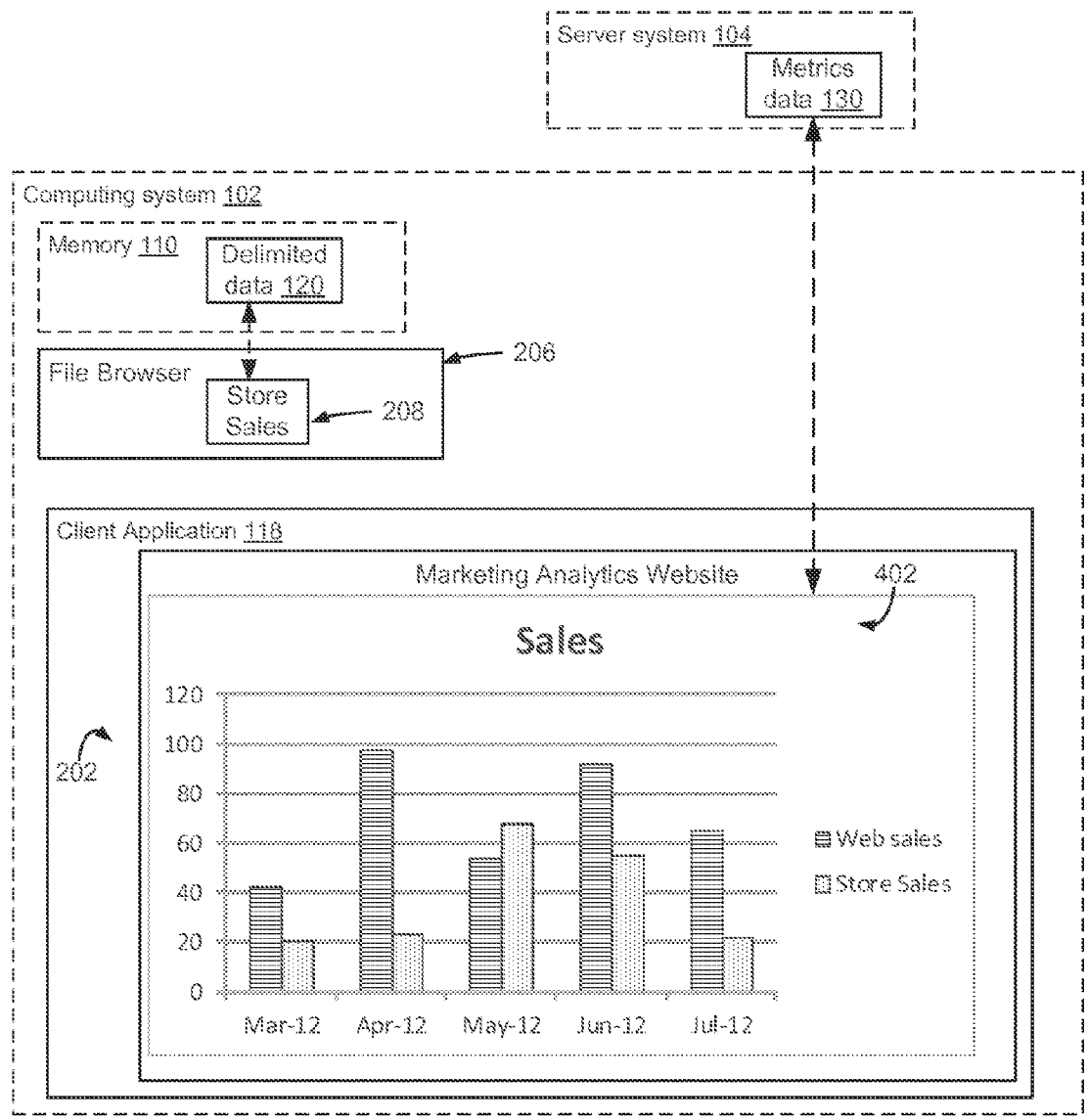
FIG. 4 is a modeling diagram depicting an example of the delimited data integrated with the metrics data for display in the graphical interface.

FIG. 4 is a modeling diagram depicting an example of the delimited data integrated with the metrics data for display in the graphical interface.

The integration module 122 can integrate at least some of the delimited data 120 with the metrics data 130 to generate updated sales data 402 for display in the graphical interface 202. As depicted in FIG. 4, integrating the delimited data 120 with the metrics data 130 can include adding bar graphs for at least some of the delimited data 120 adjacent to the bar graphs representing the metrics data 130. For example, the integration module 122 can determine that at least some of the delimited data 120 includes data associated with dates within the time period of March 2012 to July 2012 displayed in the graphical interface 202. The integration module 122 can extract data from the delimited data 120 that is associated with dates within the time period of March 2012 to July 2012. The integration module 122 can add multiple bar graphs depicting the extracted data for the months of March 2012, April 2012, May 2012, June 2012, and July 2012.

In some embodiments, the client application 118 can present the delimited data 120 in the graphical interface 202 without importing the delimited data 120 into the data source from which the metrics data 130 is retrieved. For example, in the absence of the positioning operation 302 or other data integration function, the client application may render the graphical interface 202 in the memory 110 based on instructions received from the server system 104 for rendering the graphical interface 202. The instructions received from the server system 104 can include at least some of the metrics data 130 used for rendering the bar graphs depicting the sales data 204. In response to the positioning operation 302, the client application 118 may render an updated version of the graphical interface 202 in the memory 110 based on instructions received from the server system 104, the metrics data 130 used for rendering the bar graphs for web sales, and the de-limited data used for rendering bar graphs for store sales. For example, delimited data 122 that includes metrics or other analytics data can be displayed with metrics or other analytics data obtained from the server system 104. The integration module 122 may receive metrics or other analytics data from the delimited data 122, format the metrics or other analytics data based on a type of visualization used by an application programming interface ("API") that generates the graphical interface 202, and integrate the formatted metrics or other analytics data with the graphical interface 202 by execution one or more functions or routines from the API.

In other embodiments, the client application can import the delimited data 120 into the data source from which the metrics data 130 is retrieved. For example, the integration module 122 can transmit at least some of the delimited data 120 to the server system 104. The server system 104 can add the delimited data 120 to the metrics data 130. The server system 104 can send an update to the client application 118. The update can instruct the client application 118 to display both the bar graphs for the original metrics data as well as the bar graphs for the data imported from the delimited data 120. In some embodiments, the delimited data 120 can be stored on the server system 104. The graphical interface 202 can be updated to include a link or selectable object configured to download some or all of the delimited data 120 that is stored the server system 104.

In additional or alternative embodiments, the integration module 122 can map at least some of the delimited data 120 to at least some corresponding metrics data 130. For example, the integration module 122 can automatically identify a potential mapping of one or more fields in the delimited data 120 to one or more corresponding fields in the metrics data 130. Automatically identifying a potential mapping of field(s) in the delimited data 120 to corresponding field(s) in the metrics data 130 can reduce or eliminate manual mapping of fields between the delimited data 120 and the metrics data 130 using a file transfer program or other integration process.

In one non-limiting example, the integration module 122 may import data from fields in the delimited data 120 to corresponding fields in the metrics data 130. The integration module 122 may identify a first field for each data item of the delimited data 120 that includes a date value and a second field for each data item of the delimited data 120 that includes an integer value (e.g., a number of sales on the date). The integration module 122 may map the date values in the delimited data 120 to corresponding date values in the metrics data 130. The integration module 122 may map the integer values in the delimited data 120 to corresponding integer values in the metrics data 130. The integration module 122 may add the integer values from the delimited data 120 to corresponding integer values from the metrics data 130.

In another non-limiting example, the integration module 122 may add data fields from the delimited data 120 to the metrics data 130 based on one or more mapped data fields. The integration module 122 may identify a first field for each data item of the delimited data 120 that includes a date value and a second field for each data item of the delimited data 120 that includes an integer value (e.g., a number of sales on the date). The integration module 122 may map the date values in the delimited data 120 to corresponding date values in the metrics data 130 without mapping the integer values in the delimited data 120 to integer values in the metrics data 130. The integration module 122 may add the integer values from the delimited data 120 as an additional field in the metrics data 130. The additional field can describe an additional metric other than metrics described in the metrics data 130 in the absence of the data integration.

Figure 5:
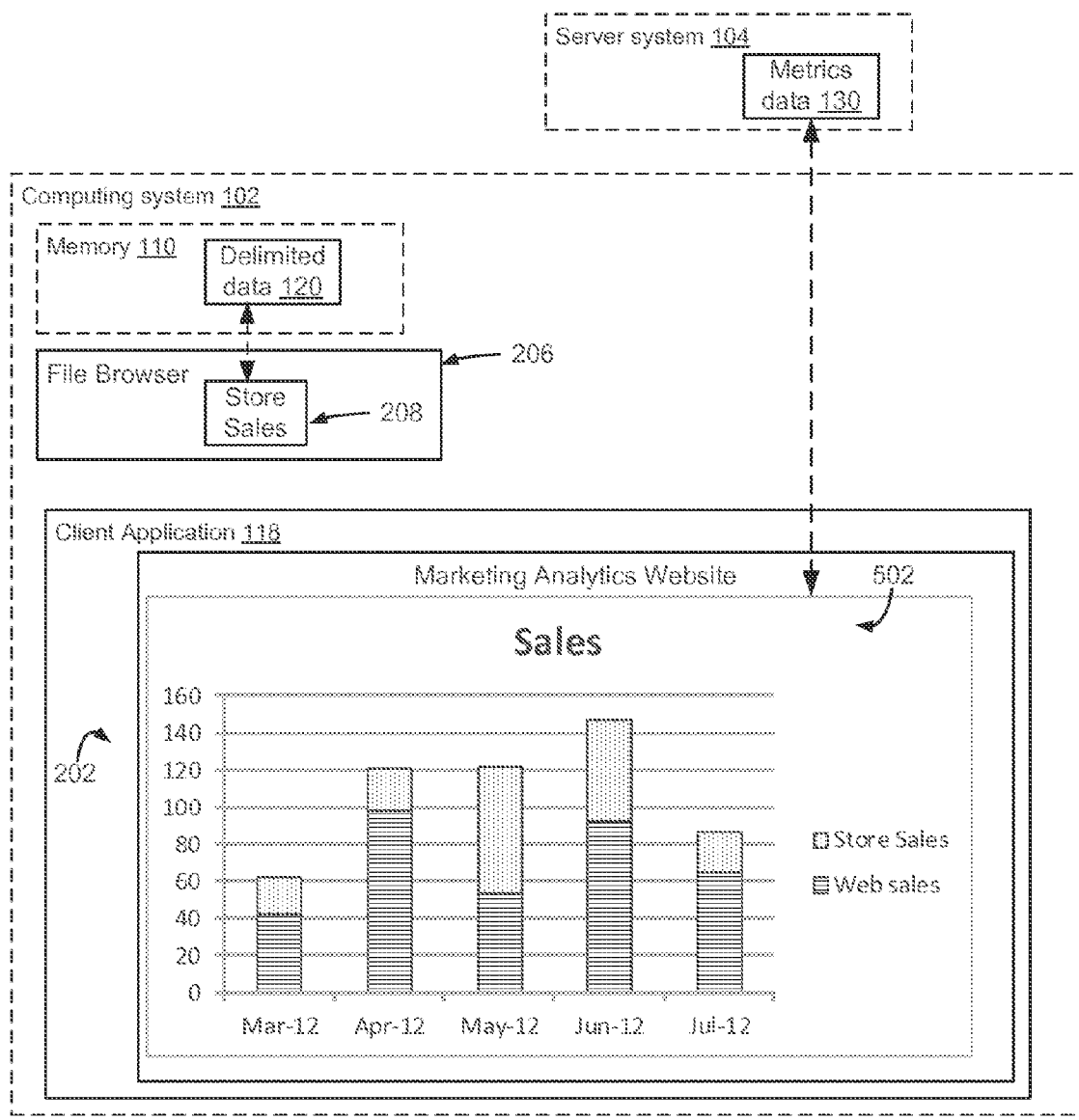
FIG. 5 is a modeling diagram depicting an alternative example of the delimited data integrated with the metrics data for display in the graphical interface.

Although FIG. 4 depicts the integrated sales data 402 with bar graphs for online sales displayed adjacent to bar graphs for store sales, any suitable display of the integrated data can be used. For example, FIG. 5 is a modeling diagram depicting an alternative example of the delimited data integrated with the metrics data for display in the graphical interface. As depicted in FIG. 5, the updated sales data 502 displayed in the graphical interface 202 can include a single bar graph for each of the displayed months. Each bar graph can have different visual indicia to indicate respective contributions of web-based sales and store-based sales. Non-limiting examples of such visual indicia include differences in coloring, differences in fill patterns, etc.

In some embodiments, the delimited data 120 and the metrics data 130 can include data associated with time intervals having different levels of granularity. For example, the delimited data 120 may include records of sales on a weekly basis and the metrics data may include records of sales on a monthly basis. The integration module 122 can aggregate data extracted from the delimited data 120 for integration with the displayed metrics data 130.

Figure 6:
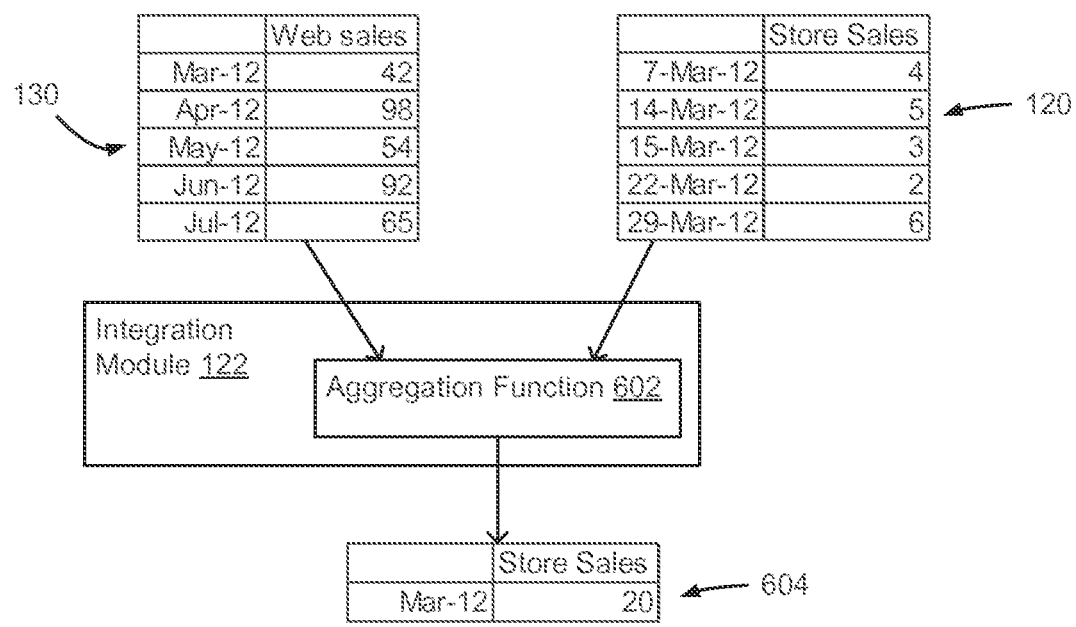
FIG. 6 is a modeling diagram depicting an example flow of communication for performing an aggregation function to integrate delimited data and metrics data from different sources.

For example, FIG. 6 is a modeling diagram depicting an example flow of communication for performing an aggregation function to integrate delimited data and metrics data from different sources. The metrics data 130 can include sales data organized by month. For example, as depicted in FIG. 6, a portion of the metrics data 130 can include web-based sales for each of the months of March 2012, April 2012, May 2012, June 2012, and July 2012. The delimited data 120 can include sales data organized by week. For example, as depicted in FIG. 6, a portion of the delimited data 120 can include store-based sales for each week in the month of March 2012.

The integration module 122 can perform an aggregation function 602 to generate aggregated data 604 for integration with the metrics data 130. The integration module 122 can analyze the metrics data 130 to determine that the metrics data 130 uses a first unit of time (i.e., a month). The integration module 122 can analyze the delimited data 120 to determine that the delimited data 120 uses a second unit of time (i.e., a week). The integration module 122 can aggregate data for the weeks of March 2012 to output a total number of sales for the month of March 2012. The integration module 122 can likewise aggregate data for the weeks of April 2012, the weeks of May 2012, the weeks of June 2012, and the weeks of July 2012. The aggregated data from the delimited data 120 for the months of March 2012, April 2012, May 2012, June 2012, and July 2012 can be integrated with the metrics data 130.

In other embodiments, the delimited data 120 can include data associated with time intervals of a lower level of granularity than the metrics data 130. For example, the delimited data 120 may include records of sales on a yearly basis and the metrics data may include records of sales on a monthly basis. The integration module 122 can extrapolate data from the delimited data 120 having a suitable granularity for integration with the displayed metrics data 130.

Figure 7:
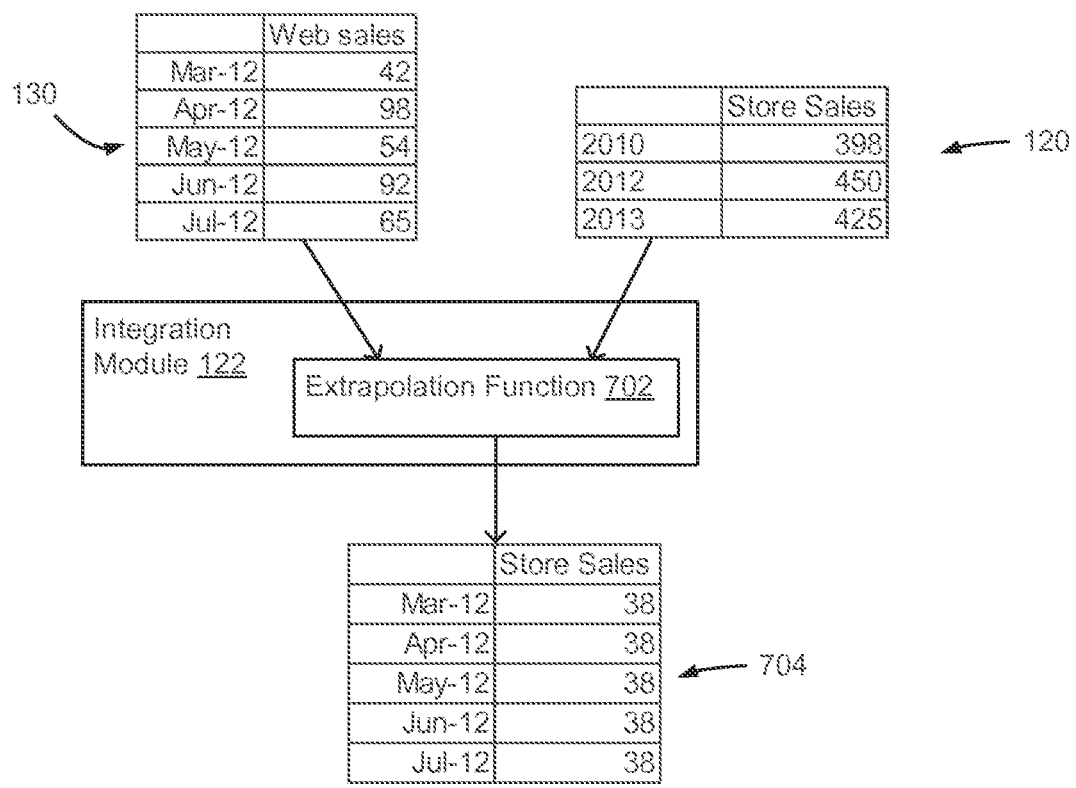
FIG. 7 is a modeling diagram depicting an example flow of communication for performing an extrapolation function to integrate delimited data and metrics data from different sources.

FIG. 7 is a modeling diagram depicting an example flow of communication for performing an extrapolation function to integrate delimited data and metrics data from different sources. The metrics data 130 can include sales data organized by month. The delimited data 120 can include sales data organized by or otherwise associated with years. For example, the delimited data 120 can include store-based sales for each of the years 2011 to 2013.

The integration module 122 can perform an extrapolation function 702 to generate extrapolated data 704 for integration with the metrics data 130. The integration module 122 can analyze the metrics data 130 to determine that the metrics data 130 uses a first unit of time (i.e., a month). The integration module 122 can analyze the delimited data 120 to determine that the delimited data 120 uses a second unit of time (i.e., a year). The integration module 122 can extrapolate estimated monthly sales for the year 2013 via any suitable process. In one non-limiting example, the integration module 122 can divide the yearly sales by 12 months and use the monthly sales number for each of March 2012, April 2012, May 2012, June 2012, and July 2012. In another non-limiting example, the integration module 122 can divide the yearly sales by 365 days and multiple each daily number of sales by the respective number of days in each of March 2012, April 2012, May 2012, June 2012, and July 2012. The extrapolated data 704 for the months of March 2012, April 2012, May 2012, June 2012, and July 2012 can be integrated with the metrics data 130.

Figure 8:
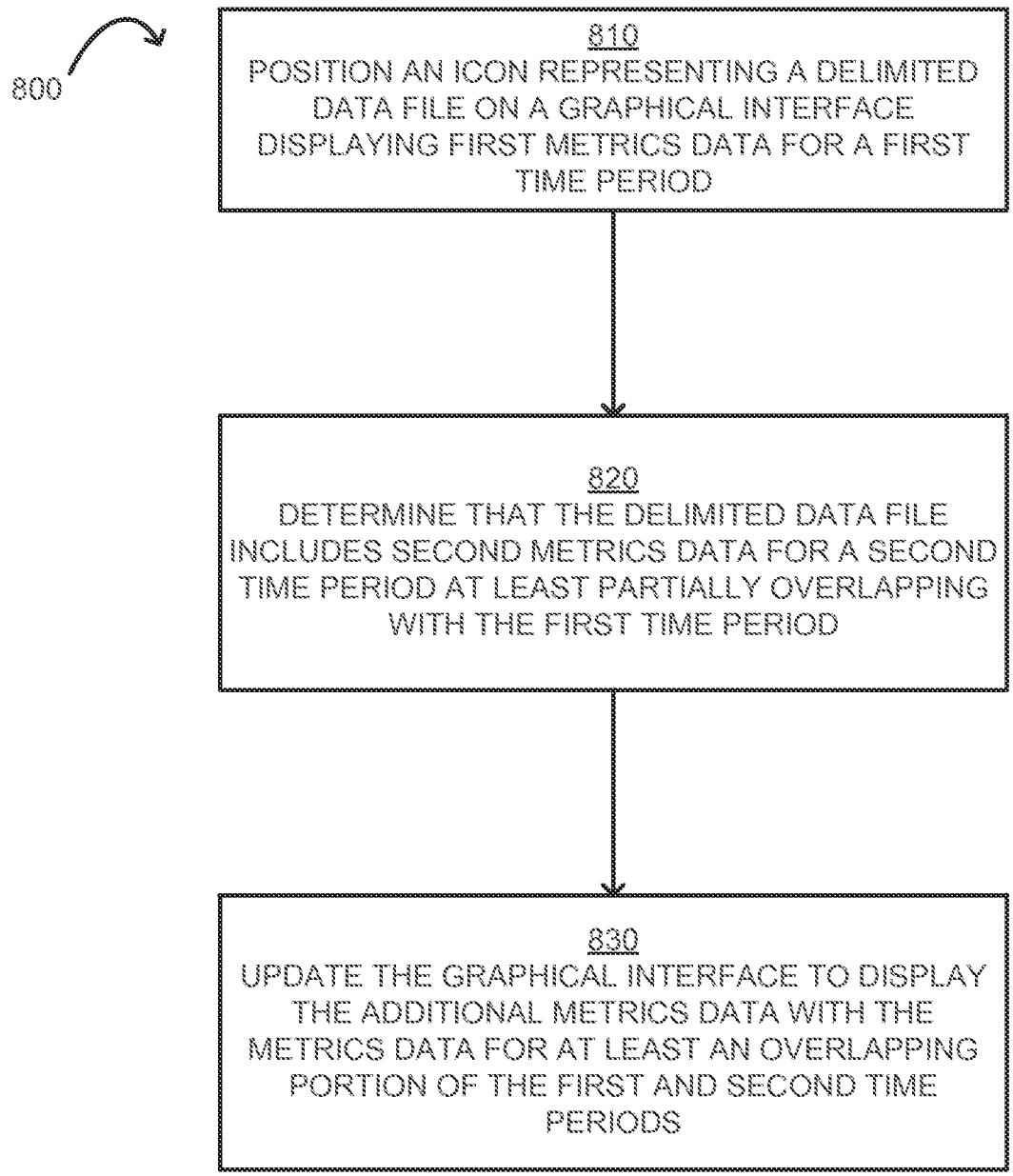
FIG. 8 is a flow chart illustrating an example method for integrating metrics data from different data sources for display in a common graphical interface.

FIG. 8 is a flow chart illustrating an example method 800 for integrating metrics data from different data sources for display in a common graphical interface. For illustrative purposes, the method 800 is described with reference to the system implementations depicted in FIG. 1 and the operations depicted in FIGS. 2-7. Other implementations, however, are possible.

The method 800 involves positioning an icon representing a de-limited data file on a graphical interface displaying first metrics data for a first time period, as shown in block 810. For example, a client application 118 can be executed by a processor 108 to position an icon 208 on a graphical interface 202, as described above with respect to FIG. 3. In some embodiments, positioning the icon over the graphical interface 202 can include executing a drag-and-drop operation. The data sources for the delimited data 120 and the metrics data can be different. For example, the delimited data 120 may be obtained from an offline data source, such as a local memory 110 of the computing system 102. The delimited data 120 may be stored to the local memory 110 in such a manner as to prevent access to the delimited data 120 via a data network 106. The metrics data 130 can be online data stored in a memory 126 in such a manner that the metrics data 130 is available via the data network 106.

The method 800 further involves determining that the delimited data file includes second metrics data for a second time period at least partially overlapping with the first time, as shown in block 820. For example, an integration module 122 executed by the processor 108 in response to a positioning operation 302 can determine that delimited data 120 and metrics data 130 include metrics data associated with time intervals in an overlapping time period, as described above with respect to FIGS. 4-5.

The method 800 further involves updating the graphical interface to display the additional metrics data with the metrics data for at least an overlapping portion between the first and second time periods, as shown in block 830. For example, an integration module 122 executed by the processor 108 can update the graphical interface 202 to display sales data 402 including at least some of the delimited data 120 and the metrics data 130 accessible from the server system 104, as described above with respect to FIGS. 4-5.

In some embodiments, the time intervals included in the delimited data 120 can have different levels of granularity than the time intervals included in the metrics data 130. Updating the graphical interface can include aggregating at least some of the delimited data 120 for integration with the metrics data 130 or extrapolating data from the delimited data 120 for integration with the metrics data 130, as described above with respect to FIGS. 6-7.

In some embodiments, the integration module 122 can upload at least some of the delimited data 120 to a data source in which the metrics data 130 is stored. The integration module 122 can configure the processor 108 to transmit the delimited data 120 to the server system 104 via the data network 106. In other embodiments, the delimited data 120 can be displayed with the metrics data 130 in the graphical interface 202 without transmitting the delimited data 120 to the server system 104.

Figure 9:
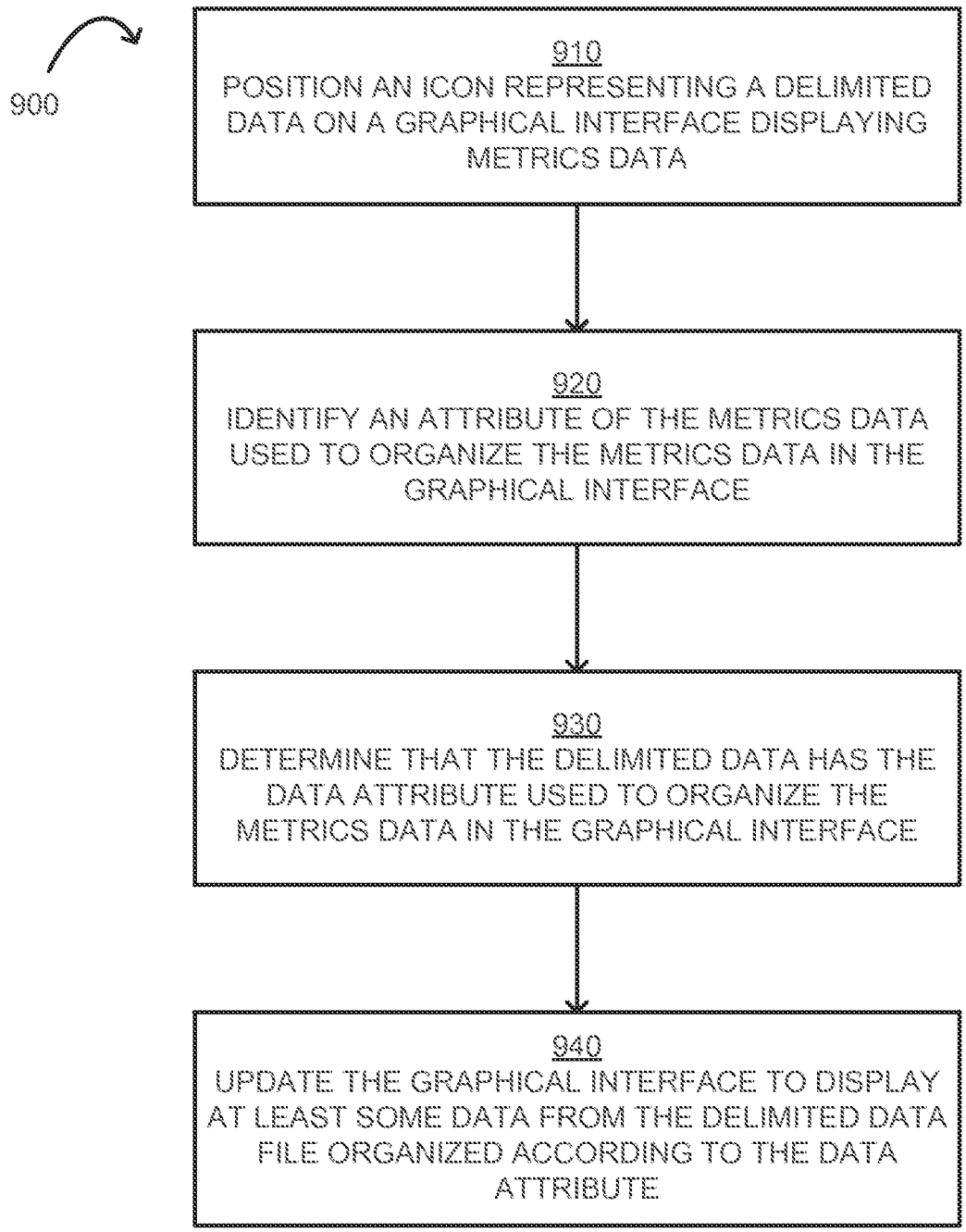
FIG. 9 is a flow chart illustrating an alternative example method for integrating metrics data from different data sources for display in a common graphical interface.

Although FIGS. 2-7 describe integrating data from different sources based on a date or time attribute, other implementations are possible. For example, FIG. 9 is a flow chart illustrating an alternative example method 900 for integrating metrics data from different data sources for display in a common graphical interface. For illustrative purposes, the method 900 is described with reference to the system implementations depicted in FIG. 1 and the operations depicted in FIGS. 2-7. Other implementations, however, are possible.

The method 900 involves positioning an icon representing a delimited data on a graphical interface displaying metrics data, as shown in block 910. For example, a client application 118 can be executed by a processor 108 to position an icon 208 on a graphical interface 202, as described above with respect to FIGS. 2-5.

The method 900 further involves identifying an attribute of the metrics data used to organize the metrics data in the graphical interface, as shown in block 920. For example, an integration module 122 can be executed by a processor 108 in response to a positioning operation 302 to identify an attribute of the metrics data 130 used to organize the metrics data 130 in the graphical interface 202, as described above with respect to FIGS. 2-5.

Any attribute of the metrics data 130 can be used to organize the metrics data 130 in the graphical interface. In some embodiments, the data attribute used to organize the data in the graphical interface can be a date or time attribute, as described above with respect to FIGS. 2-5. In other embodiments, the graphical interface 202 may present metrics data 130 organized by attributes other than time, such as (but not limited to) different geographical locations, names of different products, an x-y plot comparing a first metric (e.g., sales)

to a second metric (e.g., website visits, page views), or any other suitable type data attribute.

In some embodiments, the integration module 122 can determine that a given column from a table of the metrics data 130 is used to generate and populate an axis along which data is displayed in the graphical interface 202. The integration module 122 can determine that the data used to populate the values of the axis has an attribute that can be used to match at least some of the delimited data 120. In one non-limiting example, the integration module 122 can determine that a horizontal axis of a graphical interface 202 is populated using date or time values included in different rows or records in the metrics data 130. In another non-limiting example, the integration module 122 can determine that a horizontal axis of a graphical interface 202 is populated using geographical locations included in different rows or records in the metrics data 130. In another non-limiting example, the integration module 122 can determine that a horizontal axis of a graphical interface 202 is populated using data values for a specific business metric, such as a number of page views in a business website, a number of visits to the business website, a number of visitors to a store, etc.

The method 900 further involves determining that the delimited data has the data attribute used to organize the metrics data in the graphical interface, as shown in block 930. For example, the integration module 122 can be executed by a processor 108 to determine that the delimited data 120 has at least one attribute used to organize the metrics data 130 in the graphical interface 202. The integration module 122 can automatically identify a corresponding data attribute in the delimited data 120.

In a non-limiting example, a common data attribute between the delimited data 120 and the metrics data 130 can be a geographical location. The integration module 122 can determine that both the delimited data 120 and the metrics data 130 include a column having data values formatted as strings, that the data values formatted as strings include only two letters, and that the string "state" or some portion thereof is included in the column header. The integration module 122 can thus determine that both the delimited data 120 and the metrics data 130 can be organized by geographical locations (e.g., states, regions, etc.). The integration module 122 can organize at least some of the delimited data 120 for display in the graphical interface 202 based on the geographical locations used to organize the metrics data 130 displayed in the graphical interface 202. In additional or alternative embodiments, the integration module 122 can aggregate geographical locations identified in the delimited data 120 to integrate the delimited data 120 with metrics data 130 associated geographical locations having a lower degree of granularity. For example, the integration module 122 can determine that the delimited data 120 includes a column header for "City" or "Zip Code" and that the metrics data 130 includes a column header for "State." The integration module 122 can execute an aggregation function 602 that combines data values associated with cities or zip codes into aggregated data values associated with the state in which the cities or zip codes are located.

The method 900 further involves updating the graphical interface to display at least some of the delimited data with the metrics data organized according to the data attribute, as shown in block 940. For example, an integration module 122 executed by the processor 108 can update the graphical interface 202 to display sales data 402 including at least some of the delimited data 120 and the metrics data 130 accessible from the server system 104. For cases in which the metrics data 130 is organized according to date and/or time values, the sales data 402 can include both delimited data 120 and metrics data 130 organized according to data and/or time. For cases in which the metrics data 130 is organized according to geographical locations, the sales data 402 can include both delimited data 120 and metrics data 130 organized according to geographical locations. For cases in which the metrics data 130 is organized according to a given business metric, the sales data 402 can include both delimited data 120 and metrics data 130 organized according to the given business metric.

In some embodiments, the delimited data 120 may include data values for a data attribute that do not overlap with data values for the data attribute in the metrics data 130. In one non-limiting example, the delimited data 120 and the metrics data 130 may include data that can be organized based on date and/or time without the delimited data 120 and the metrics data 130 having any overlapping time values. In another non-limiting example, the delimited data 120 and the metrics data 130 may include data that can be organized based on geographical location without the delimited data 120 and the metrics data 130 having any data associated with a common geographical location. Updating the graphical interface 202 to include both the delimited data 120 and the metrics data 130 may include, for example, modifying an axis along which data is organized to include values from both the delimited data 120 and the metrics data 130. For example, a horizontal axis may be expanded to include data, time, geographic, or other values of the data attribute from the delimited data 120 positioned adjacent to values of the data attribute from the metrics data 130.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

The invention claimed is:

1. A method for automatically integrating and displaying data, the method comprising:
    positioning an icon representing a first field of data in a delimited data file and a second field of the data in the delimited data file on a graphical interface, wherein the graphical interface is provided by a first application and is displaying first metrics data for a first time period, the first time period determined from a first time data, wherein the first metrics data and the delimited data file are obtained from different data sources, and wherein the delimited data file is generated by a second application that is different from the first application;
    responsive to positioning the icon:
        automatically identifying a second time data in the first field of data and second metrics data in the second field of data,
        automatically identifying a first common attribute between the second time data and the first time data,
        automatically determining, based on the identified first common attribute, that the second metrics data is for a second time period at least partially overlapping with the first time period,
        automatically identifying a second common attribute between the second metrics data and the first metrics data,
        automatically identifying, based on the identified second common attribute, a mapping of the second metrics data to the first metrics data, and
        automatically integrating, based on the identified mapping and time data, the second metrics data into the first metrics data; and
    updating the graphical interface to display at least some of the second metrics data integrated with the first metrics data for at least an overlapping portion between the first time period and the second time period.

2. The method of claim 1, wherein determining from the second time data that the second metrics data is for the second time period comprises:
    determining that at least some data items from the second metrics data include time intervals for respective metrics; and
    determining the second time period from the time intervals.

3. The method of claim 1, further comprising identifying a non-overlapping portion of the second time period that does not overlap with the first time period and wherein updating the graphical interface further comprises displaying at least some of the second metrics data for the identified non-overlapping portion of the second time period.

4. The method of claim 1, wherein the first metrics data is organized in the graphical interface based on a first plurality of time intervals, wherein each of the first plurality of time intervals uses a first unit of time larger than a second of unit of time used by each of a second plurality of time intervals for the second metrics data, wherein updating the graphical interface comprises aggregating at least some data from the delimited data file based on the first unit of time.

5. The method of claim 1, wherein the first metrics data is organized in the graphical interface based on a first plurality of time intervals, wherein each of the first plurality of time intervals uses a first unit of time smaller than a second of unit of time used by each of a second plurality of time intervals for the second metrics data, wherein updating the graphical interface comprises extrapolating at least some of the second metrics data from the delimited data for display in the graphical interface file based on the first unit of time.

6. The method of claim 1, wherein positioning the icon comprises performing a drag-and-drop operation.

7. The method of claim 1, wherein the first metrics data is obtained from a data source accessible via a data network and the delimited data file is obtained from a local memory device.

8. The method of claim 7, further comprising updating the data source accessible via the data network with at least some of the second metrics data from the delimited data file.

9. The method of claim 1, wherein updating the graphical interface comprises displaying the second metrics data adjacent to the first metrics data.

10. The method of claim 9, wherein displaying the second metrics data adjacent to the first metrics data comprises:
    identifying a plurality of time intervals included in the overlapping portion between the first time period and the second time period, wherein at least one first respective data item from the first metrics data and at least one second respective data item from the second metrics data is associated with each of the plurality of time intervals; and
    displaying the at least one first respective data item adjacent to the at least one second respective data item for each of the plurality of time intervals.

11. The method of claim 1, wherein updating the graphical interface comprises:
    determining that a first metric for the first metrics data is the same as a second metric for the second metrics data; and
    based on determining that the first metric is the same as the second metric, displaying at least some of the second metrics data describing the second metric combined with at least some of the first metrics data describing the first metric.

12. The method of claim 1, further comprising:
    updating the graphical interface to display suggested options for the integration of the second metrics data into the first metrics data;
    receiving manual configuration instructions, wherein the manual configuration includes selecting a displayed option; and
    further updating the graphical interface to display at least some of the second metrics data further integrated with the first metrics data, wherein the further integration is based in part upon the received manual configuration instructions.

13. The method of claim 12, further comprising:
storing data describing the received manual configuration instructions; and
using the stored data to improve accuracy of subsequent metrics data integrations.

14. The method of claim 1, wherein automatically integrating the second metrics data into the first metrics data further comprises:
mapping a date value from the second time data to a corresponding date value from the first time data,
identifying one or more integer values from the second field of data, and
adding, as an additional field in the first metrics data, the identified integer values.

15. A method for automatically integrating and displaying data, the method comprising:
positioning an icon representing a plurality of data fields in a delimited data collection on a graphical interface, wherein the graphical interface is provided by a first application and is displaying first metrics data, wherein the delimited data collection is generated by a second application that is different from the first application;
responsive to positioning the icon on the graphical interface:
automatically identifying a first data attribute of the first metrics data, the first data attribute being used to organize the first metrics data in the graphical interface,
automatically determining that second metrics data has the first data attribute used to organize the first metrics data in the graphical interface,
automatically identifying a second data attribute of the first metrics data,
automatically identifying, based on the identified second data attribute, a mapping of the second metrics data to the first metrics data, and
automatically integrating, based on the identified mapping, the second metrics data into the first metrics data; and
updating the graphical interface to display the second metrics data integrated with the first metrics data, wherein the first metrics data and the second metrics data are organized in the graphical interface based on the first data attribute.

16. The method of claim 15, wherein the first data attribute comprises a time attribute.

17. The method of claim 15, wherein the first data attribute comprises a geographic attribute.

18. The method of claim 15, further comprising:
determining that the second metrics data includes data items having non-overlapping values for the first data attribute with respect to data items of the first metrics data; and
updating the graphical interface to display the data items having the non-overlapping values adjacent to the first metrics data.

19. A non-transitory computer-readable medium embodying program code for automatically integrating and displaying data, the program code executable by a processing device, the non-transitory computer-readable medium comprising:
program code for positioning an icon representing a first field of data in a delimited data file and a second field of the data in the delimited data file on a graphical interface, wherein the graphical interface is provided by a first application and is displaying first metrics data for a first time period, the first time period determined from a first time data, wherein the first metrics data and the delimited data file are obtained from different data sources, and wherein the delimited data file is generated by a second application that is different from the first application;
program code for responding to positioning the icon by:
automatically identifying a second time data in the first field of data and second metrics data in the second field of data,
automatically identifying a first common attribute between the second time data and the first time data,
automatically determining, based on the identified first common attribute, that the second metrics data is for a second time period at least partially overlapping with the first time period,
automatically identifying a second common attribute between the second metrics data and the first metrics data,
automatically identifying, based on the identified second common attribute, a mapping of the second metrics data to the first metrics data, and
automatically integrating, based on the identified mapping and time data, the second metrics data into the first metrics data; and
program code for updating the graphical interface to display at least some of the second metrics data integrated with the first metrics data for at least an overlapping portion between the first time period and the second time period.

20. The non-transitory computer-readable medium of claim 19, further comprising program code for identifying a non-overlapping portion of the second time period that does not overlap with the first time period and wherein updating the graphical interface further comprises displaying at least some of the second metrics data for the identified non-overlapping portion of the second time period.

21. The non-transitory computer-readable medium of claim 19, wherein the first metrics data is organized in the graphical interface based on a first plurality of time intervals, wherein each of the first plurality of time intervals uses a first unit of time smaller than a second of unit of time used by each of a second plurality of time intervals for the second metrics data, wherein updating the graphical interface comprises extrapolating at least some of the second metrics data from the delimited data for display in the graphical interface file based on the first unit of time.

22. The non-transitory computer-readable medium of claim 21, further comprising program code for updating the data source accessible via the data network with at least some of the second metrics data from the delimited data file.

* * * * *